United States Patent
Amino et al.

(10) Patent No.: US 7,989,550 B2
(45) Date of Patent: Aug. 2, 2011

(54) RUBBER COMPOSITION FOR TIRE TREAD

(75) Inventors: Naoya Amino, Hiratsuka (JP); Akitomo Sato, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 54 days.

(21) Appl. No.: 11/963,028

(22) Filed: Dec. 21, 2007

(65) Prior Publication Data

US 2008/0161479 A1      Jul. 3, 2008

(30) Foreign Application Priority Data

Dec. 27, 2006    (JP) .................................. 2006-352620

(51) Int. Cl.
  *C08L 9/06*   (2006.01)
  *C08L 45/00*  (2006.01)
  *C08K 3/36*   (2006.01)
  *C08K 3/04*   (2006.01)
  *C08L 7/00*   (2006.01)

(52) U.S. Cl. ........ 525/237; 525/216; 524/492; 524/495; 524/526

(58) Field of Classification Search .................. 524/518, 524/526, 492, 495; 525/191, 216, 237
See application file for complete search history.

(56) References Cited

U.S. PATENT DOCUMENTS

| | | | |
|---|---|---|---|
| 6,022,923 A * | 2/2000 | Araki et al. ................ | 524/494 |
| 6,403,720 B1 * | 6/2002 | Chino et al. ................ | 525/191 |
| 2006/0094815 A1 * | 5/2006 | Kunisawa et al. ........... | 524/496 |
| 2006/0167160 A1 * | 7/2006 | Nakagawa et al. .......... | 524/442 |
| 2007/0037908 A1 * | 2/2007 | Pille-Wolf ................... | 524/270 |
| 2007/0167555 A1 * | 7/2007 | Amino et al. ................ | 524/495 |
| 2007/0187032 A1 * | 8/2007 | Wang ........................... | 156/327 |
| 2009/0292063 A1 * | 11/2009 | Robert et al. ................ | 524/518 |

FOREIGN PATENT DOCUMENTS

| | | |
|---|---|---|
| EP | 1834811 A1 * | 9/2007 |
| FR | 2889538 A1 * | 2/2007 |
| JP | 01139635 | 6/1989 |
| JP | 05287126 A * | 11/1993 |
| JP | 06057086 A * | 3/1994 |
| JP | 09309978 A * | 12/1997 |
| JP | 10204216 | 8/1998 |
| WO | WO-2005/082995 | 9/2005 |
| WO | WO 2005082995 A1 * | 9/2005 |

OTHER PUBLICATIONS

Machine Translated English equivalent of JP 06-057086 A.*
Machine Translated English equivalent of FR 2889538 A1.*
Machine translated English equivalent of JP 05287126 A, 5 pages.*
Machine translated English equivalent of JP 09309978 A, 4 pages.*
Dercolyte TS 105 Product Information, 2 pages.*

* cited by examiner

*Primary Examiner* — Milton I Cano
*Assistant Examiner* — Brieann R Fink
(74) *Attorney, Agent, or Firm* — Connolly Bove Lodge & Hutz LLP

(57) ABSTRACT

A rubber composition for a tire tread comprising (A) 100 parts by weight of a rubber component containing (a) 50 to 95 parts by weight of a diene-based rubber containing 50 to 100% by weight of an aromatic vinyl-conjugated diene copolymer rubber and (b) 5 to 50 parts by weight of a conjugated diene-based rubber gel having a toluene swelling index $Q_i$ of 16 to 70 and (B) 3 to 40 parts by weight, based upon 100 parts by weight of the total rubber component, of a copolymer resin of an aromatic vinyl and dipentene and/or pinene having a softening point of 100 to 150° C. and a high performance tire using the above rubber composition are disclosed.

5 Claims, No Drawings

RUBBER COMPOSITION FOR TIRE TREAD

RELATED APPLICATIONS

This application claims priority to Japanese Application No. 2006-352620 filed Dec. 27, 2006, disclosure of which is incorporated herein by reference.

TECHNICAL FIELD

The present invention relates to a rubber composition for a tire tread, more particularly relates to a rubber composition for a high performance tire tread having a high grip force, which is suitable for use as a tire of a sports car, racing car, etc. and to a high performance pneumatic tire using the same.

BACKGROUND ART

High performance tires used for sports cars, racing cars and the like are required that the grip force at low temperatures be high and further that the decrease in performance at the time of the repeated use in circuit driving and the like be small. Namely, it is important to exhibit a high grip force from the onset of driving and to maintain the performance after the generation of large heat in the tire during driving. From such viewpoints, the present inventors previously developed a rubber composition capable of improving the grip force of a tire, without impairing the blowout resistance (see Japanese Patent Publication (A) No. 10-204216). However, in the industry, further needs are still existed.

DISCLOSURE OF THE INVENTION

Accordingly, the object of the present invention is to provide a rubber composition for a high performance tire tread having a grip performance at low temperatures and also a small decrease in the performance at the time of the repeated use in circuit driving and the like, namely, exhibiting a high grip force from the onset of driving, and capable of maintaining the performance even after the generation of heat in the tire by the driving.

In accordance with the present invention, there is provided a rubber composition for a tire tread comprising (A) 100 parts by weight of a rubber component comprising (a) 50 to 95 parts by weight of a diene-based rubber containing 50 to 100% by weight of an aromatic vinyl-conjugated diene copolymer rubber and (b) 5 to 50 parts by weight of a conjugated diene-based rubber gel having a toluene swelling index $Q_i$ of 16 to 70 and (B) 3 to 40 parts by weight, based upon 100 parts by weight of the total rubber component, of a copolymer resin of an aromatic vinyl and dipentene and/or pinene having a softening point of 100 to 150° C.

According to the present invention, it is possible to obtain a rubber composition for a tire tread having, in addition to a grip performance at low temperatures, a desired grip performance etc. even after the generation of heat in the tire by the driving, by compounding, into 50 to 95 parts by weight of a diene-based rubber containing 50 to 100% by weight of an aromatic vinyl-conjugated diene copolymer rubber, 5 to 50 parts by weight of a conjugated diene-based rubber gel having a toluene swelling index $Q_i$ of 16 to 70, where the total amount of the rubber component is 100 parts by weight, and 3 to 40 parts by weight, per 100 parts by weight of the total rubber component, of a copolymer resin of an aromatic vinyl and dipentene and/or pinene having a softening point of 100 to 150° C.

BEST MODE FOR CARRYING OUT THE INVENTION

The present inventors engaged in research in order to resolve the above problems and, as a result, confirmed that a rubber composition containing a conjugated diene-based rubber gel having a toluene swelling index $Q_i$ of 16 to 70 exhibits a high grip force at the onset of driving, but has a problem of a drop in performance during driving and found that, to maintain the grip force from the onset of driving, in addition to the diene-based rubber gel, it is effective to further include a copolymer resin of an aromatic vinyl and dipentene (or limonene) and/or pinene having a softening point of 100 to 50° C.

According to the present invention, 5 to 50 parts by weight of a conjugated diene-based rubber gel having a toluene swelling index $Q_i$ of 16 to 70, where the total amount of rubber component is 100 parts by weight, and 3 to 40 parts by weight, based upon 100 parts by weight of the total rubber component, of a copolymer resin of an aromatic vinyl and dipentene and/or pinene having a softening point at 100 to 150° C. are compounded into 50 to 95 parts by weight of a diene-based rubber. Note, that, here, the "toluene swelling index $Q_i$" means the value found by soaking 0.2 g of the gelled rubber in 100 ml of toluene for 24 hours, then weighing the weight (i.e., wet weight) of the rubber at that time, and after drying, weighing the dry weight, and determining a ratio of the wet weight/the dry weight.

As the rubber component of the rubber composition of the present invention, a diene-based rubber containing 50 to 100% by weight of an aromatic vinyl-conjugated diene copolymer rubber (e.g., styrene-butadiene copolymer rubber, styrene-isoprene copolymer rubber, α-methyl-styrene-butadiene copolymer rubber and the like), preferably 60 to 100% by weight (e.g., other than aromatic vinyl-conjugated diene copolymer rubber, natural rubber, polybutadiene rubber, polyisoprene rubber, acrylonitrile-butadiene copolymer rubber, butadiene-isoprene copolymer rubber, and the like) is used. If the amount of the aromatic vinyl-conjugated diene copolymer rubber is small, the grip force undesirably becomes insufficient.

The rubber composition of the present invention contains, based upon the 50 to 95 parts by weight, preferably 60 to 93 parts by weight, of a diene-based rubber, 5 to 50 parts by weight, preferably 7 to 40 parts by weight, where the total amount of the rubber component is 100 parts by weight, of a conjugated diene-based rubber gel having a toluene swelling index $Q_i$ of 16 to 70, preferably 20 to 65, and 3 to 40 parts by weight, preferably 5 to 35 parts by weight, based upon 100 parts by weight of the total amount of the rubber component, of a copolymer resin of an aromatic vinyl (e.g., styrene, α-methyl-styrene, p-methyl-styrene, p-chlorostyrene, and vinylnaphthalene) and dipentene and/or pinene having a softening point of 100 to 150° C., preferably 103 to 140° C.

If the $Q_i$ of the conjugated diene-based rubber gel is less than 16, the rubber gel becomes too hard and the improvement effect in the grip force is insufficient, while conversely if it is more than 70, the effect as a rubber gel cannot be expected and the grip is not improved. When the amount of the rubber gel is less than 5 parts by weight, the effect of improvement in the grip is insufficient, while if more than 50 parts by weight, the processability undesirably deteriorates. If the softening point of the copolymer resin is less than 100° C., it is not possible to improve the desired sustainability of the grip. Since the mixing temperature of the rubber is generally around 150° C., the dispersion of the resin during the mixing becomes undesirably poor, if the softening point of the resin is more than 150° C., due to the fact that the resin is not melted during the mixing. Note that the softening point means the value measured by the method according to JIS K6220. If the amount of the copolymer resin is less than 3 parts by weight, the effect of improvement in the sustainability of the gripo is insufficient, while conversely if more than 40 parts by weight, the grip at the onset of driving undesirably declines.

In a preferred embodiment of the present invention, the diene-based rubber has an average glass transition temperature $T_g$, determined by a differential scanning calorimeter (DSC) at a rate of temperature increase of 20° C./min and calculated by the midpoint method, of −45° C. to 0° C., preferably −43° C. to −5° C. and includes a total of 50 to 200 parts by weight, preferably 60 to 180 parts by weight, of carbon and/or silica having a nitrogen adsorption specific surface area ($N_2SA$), determined by a method according to ASTM D3037, of 80 to 400 m²/g, preferably 85 to 3.00 m²/g. If the Tg of the diene-based rubber is less than −45° C., the grip is liable to be decreased, while if more than 0° C., the rubber becomes hard and the grip at the onset of driving is liable to be decreased. If the nitrogen adsorption specific surface area of the carbon black and/or silica is less than 80 m²/g, the grip is liable to be decreased, while if conversely more than 400 m²/g, the processability is liable to be deteriorated. If the total amount of the carbon black and/or silica is less than 50 parts by weight, the grip is liable to be decreased, while conversely if more than 200 parts by weight, the processability is liable to be deteriorated.

The conjugated diene-based rubber gel having a $Q_i$ of 16 to 70 usable in the present invention is a well-known substance and preferably has 49.9 to 99.9% by weight of conjugated diene monomer units, more preferably 51.9 to 89.9% by weight, 50 to 0% by weight of aromatic vinyl monomer units, more preferably 48 to 10% by weight, and 0.1 to 1.5% by weight of polyfunctional monomer units, more preferably 0.1 to 1.2% by weight. If the amount of the polyfunctional monomer units is small, the effect of improvement in the grip is liable to become insufficient, while conversely if it is large, the gel rubber becomes too hard and the grip is liable not to be improved. If the amount of aromatic vinyl units is large, the styrene can easily form blocks and the flexibility as a rubber is liable to be impaired.

As the conjugated diene monomer units, for example, 1,3-butadiene, 2-methyl-1,3-butadiene, 1,3-pentadiene, 2-chloro-1,3-butadiene and the like may be mentioned. 1,3-butadiene and 2-methyl-1,3-butadiene are preferable, and 1,3-butadiene is most preferable.

As the aromatic vinyl-monomer units, for example, styrene, o-methylstyrene, m-methylstyrene, p-methylstyrene, 2,4-di-methylstyrene, o-ethylstyrene, m-ethylstyrene, p-ethylstyrene, p-t-butylstyrene, α-methylstyrene, α-methyl-p-methylstyrene, o-chlorostyrene, p-chlorostyrene, m-chlorostyrene, p-bromostyrene, 2-methyl-4,6-dichlorostyrene, 2,4-dibromostyrene, vinylnaphthalene and the like may be mentioned. Styrene is preferable.

As the polyfunctional monomer units, compounds used in order to effectively form a gel structure and having carbon-carbon double bonds which can copolymerize with at least two, preferably two to four conjugated diene monomers, may be used. For example, diisopropenylbenzene, divinylbenzene, triisopropenylbenzene, trivinylbenzene, and other polyhydric vinyl compounds; vinyl acrylate, vinyl methacrylate, allyl methacrylate and other unsaturated ester compounds of α,β-ethylene unsaturated carboxylic acids; diallyl phthalate, triallyl cyanurate, triallyl isocyanurate, triallyl trimellitic acid, and other unsaturated ester compounds of polyhydric carboxylic acids; ethyleneglycol diacrylate, ethyleneglycol dimethacrylate, propyleneglycol dimethacrylate, and other unsaturated ester compounds of polyhydric alcohols; 1,2-polybutadiene, divinylether, divinylsulfone, N,N'-m-phenylmalemide and the like may be mentioned.

The conjugated diene-based rubber gel according to the present invention can be produced, for example, by emulsion polymerization of the above component at a temperature of, for example, −5° C. to 80° C.

The rubber composition of the present invention may include, as optional components, a total of 50 to 200 parts by weight of carbon black and/or silica. The types of the carbon black or silica usable in the present invention is not particularly limited. For example, as the carbon black, furnace black, acetylene black, thermal black, channel black, graphite or any other carbon black may be included in a rubber composition may be used. Among these, those having an $N_2SA$ of 80 to 400 m²/g are preferable as mentioned above. These carbon blacks may be used alone or in any combinations of two or more types. The silica usable in the present invention is not particularly limited. The dry process white carbon, wet process white carbon, colloidal silica, the precipitated silica disclosed in Japanese Patent Publication (A) No. 62-62838, and any other silica, which can be contained in rubber compositions, may be used. Among these, the wet process white carbon (i.e., wet silica) mainly containing silica anhydride is preferable. These silicas preferably have an $N_2SA$ of 80 to 400 m²/g, as explained above. They may be used alone or in any combinations of two or more types.

The copolymer resin content usable in the rubber composition according to the present invention is a dipentene-aromatic vinyl copolymer resin, pinene-aromatic vinyl copolymer resin, dipentene pinene-aromatic vinyl copolymer resin, or any combinations thereof having a softening point of 100 to 150° C. Such resins are well known as, for example, dipentene-styrene copolymer resin or pinene-styrene copolymer resin. Specifically, various commercially available products may be used. As a dipentene-aromatic vinyl copolymer resin, for example, commercially available YS resin TO-105, YS resin TO-125 and the like made by Yasuhara Chemical Co. Ltd. may be suitably used. As a pinene-aromatic vinyl copolymer resin, it is possible to use, for example, the commercially available YS resin TR-105 and the like manufactured by Yasuhara Chemical Co. Ltd.

The rubber composition according to the present invention may include, in addition to the above-mentioned components, reinforcing agents (or fillers) other than carbon black and silica, vulcanization or cross-linking agents, vulcanization or cross-linking accelerators, various oils, antioxidants, plasticizers and various other additives generally compounded into a tire and other rubber compositions. Such additives can be kneaded in by a general method to make the compositions which are then used for vulcanization or cross-linking. The amounts of these additives may be made the conventional general amounts so long as the object of the present invention is not adversely affected. Further, the method of using the rubber composition of the present invention to produce high performance tires may be according to the conventional method.

EXAMPLES

Examples will now be used to further explain the present invention, but the scope of the present invention is not limited to these Examples.

Examples 1 to 4 and Comparative Examples 1 to 3

Preparation of Sample

In each of the formulations shown in Table I, the compounding agents other than the sulfur and vulcanization accelerator were mixed by a 16 liter Banbury mixer for approximately 5 minutes. The speed of the rotor was made variable, while the temperature at the time of discharge was adjusted to 150° C. The master batch thus obtained was again mixed by a 16 liter Banbury mixer for approximately 3 minutes. Next, the master batch thus obtained was wound around a 8×16 inch roll, then the sulfur and vulcanization accelerator were added and the resultant mixture was mixed for approximately 3 minutes.

Tests for Evaluation of Physical Properties

Each unvulcanized rubber obtained above was used to prepare a tire having a size of 225/45 R17 by an ordinary method. This was used for a steering stability test. Namely, the tire was fitted on a car of 2500 cc displacement and run for 10 laps around a 2.5 km track while swerving so as to evaluate the grip force at the onset and the end of driving.

The grip force was scored, with 3 points as the standard, as follows:

3.5: good to the extent capable of being slightly felt,
4: good to the extent capable of being sufficiently felt,
4.5: good to the extent capable of being clearly felt, and
2.5: poor to the extent capable of being slightly felt.

The results are shown in Table I.

Industrial Applicability

According to the present invention, by compounding into a diene-based rubber containing an aromatic vinyl-conjugated diene copolymer, a conjugated diene-based rubber gel having a toluene swelling index $Q_i$ of 16 to 70 and furthermore by compounding an aromatic vinyl-dipentene and/or pinene copolymer resin having a softening point of 100 to 150° C., a high grip force is exhibited from the onset of driving and the performance can be maintained even after the tire generates much heat during driving and, therefore, the resultant rubber composition can be used effectively as a rubber composition for a high performance tire.

The invention claimed is:

1. A rubber composition for a tire tread of a high performance tire of a sports car or of a racing car comprising (A) 100 parts by weight of a rubber component comprising (a) 50 to 95 parts by weight of a diene-based rubber containing 50 to 100% by weight of a styrene-1,3-butadiene copolymer rubber having an average glass transition temperature $T_g$ of −43° C. to −5° C. and (b) 5 to 50 parts by weight of a conjugated diene-based rubber gel having a toluene swelling index $Q_i$ of 16 to 70 and 51.9 to 89.9% by weight of conjugated diene monomer units 48 to 10% by weight of an aromatic vinyl monomer units and 0.1 to 1.2% by weight of polyfunctional monomer units, (B) 3 to 40 parts by weight, based upon 100 parts by weight of the total rubber component, of a dipentene-styrene copolymer resin having a softening point of 125° C. to

TABLE I

| | Comp. Ex. 1 | Comp. Ex. 2 | Ex. 1 | Ex. 2 | Comp. Ex. 3 | Ex. 3 | Ex. 4 |
|---|---|---|---|---|---|---|---|
| Formulation (parts by weight) | | | | | | | |
| Nipol 1721*[1] | 110 (80) | 82.5 (60) | 82.5 (60) | 82.5 (60) | 82.5 (60) | 99 (72) | 55 (40) |
| RSS#3*[2] | 20 | 20 | 20 | 20 | 20 | 20 | 20 |
| Nipol 9560*[3] | — | 25.6 (20) | 25.6 (20) | 25.6 (20) | 25.6 (20) | 10.24 (8) | 51.2 (40) |
| Zeosil 1165MP*[4] | 45 | 45 | 45 | 45 | 45 | 45 | 45 |
| Seast 9*[5] | 45 | 45 | 45 | 45 | 45 | 45 | 45 |
| Zinc oxide type*[6] | 3 | 3 | 3 | 3 | 3 | 3 | 3 |
| Beads Stearic Acid*[7] | 1 | 1 | 1 | 1 | 1 | 1 | 1 |
| SANTOFLEX 6PPD*[8] | 2 | 2 | 2 | 2 | 2 | 2 | 2 |
| TO-125*[9] | — | — | 5 | 15 | — | 15 | 15 |
| TO-85*[10] | — | — | — | — | 15 | — | — |
| Process X-140*[11] | 15 | 16.9 | 11.9 | 1.9 | 11.9 | 0.76 | 3.8 |
| Powdered sulfur*[12] | 2 | 2 | 2 | 2 | 2 | 2 | 2 |
| Noccelar CZ*[13] | 2 | 2 | 2 | 2 | 2 | 2 | 2 |
| Evaluated physical property | | | | | | | |
| Initial grip characteristic | 3 | 4 | 4 | 4 | 4.5 | 3.5 | 4.5 |
| Grip sustainability | 3 | 2.5 | 3.5 | 4 | 2.5 | 4 | 3.5 |

(Note)
Numerical values in parentheses of amounts of Nipol 1721 and Nipol 9560 show parts by weight of rubber.
Notes of Table 1
*[1]SBR ($T_g$ = −31° C., 37.5 phr oil extended) made by Nippon Zeon Corporation
*[2]Natural rubber
*[3]Gel rubber ($Q_i$ = 35, 28 phr oil extended) (styrene amount 41%) made by Nippon Zeon Corporation
*[4]Wet silica ($N_2SA$ = 160 $m^2/g$) made by Rhodia Japan Ltd.
*[5]Carbon black ($N_2SA$ = 142 $m^2/g$) made by Tokai Carbon Co., Ltd.
*[6]Made by Seido Chemical Industry Co., Ltd.
*[7]Made by NOF Corporation
*[8]DLEXSYS antioxidant
*[9]Dipentene-styrene resin (softening point = 125° C.) made by Yasuhara Chemical Co. Ltd.
*[10]Dipentene-styrene resin (softening point = 85° C.) made by Yasuhara Chemical Co. Ltd.
*[11]Oil-based softening agent made by Japan Energy Corporation
*[12]Made by Tsurumi Chemical Co. Ltd.
*[13]Vulcanization accelerator made by Ouchi Shinko Chemical Industrial Co., Ltd.

150° C. and (C) 50 to 200 parts by weight, in total, of carbon and silica having a nitrogen adsorption specific surface area ($N_2SA$) of 80 to 400 $m^2/g$.

2. A high performance tire of a sports car or of a racing car using the rubber composition according to claim 1 as a tread.

3. The rubber composition as claimed in claim 1, wherein the softening point of the copolymer resin is 125° C. to 140° C.

4. A method for maintaining high grip force on the onset of driving and after the driving by using, as a tire tread of a high performance tire of a sports car or of a racing car, a rubber composition comprising:
  (A) 100 parts by weight of a rubber component comprising (a) 50 to 95 parts by weight of a diene-based rubber containing 50 to 100% by weight of a styrene-1,3-butadiene copolymer rubber having an average glass transition temperature $T_g$ of −43° C. to −5° C. and (b) 5 to 50 parts by weight of a conjugated diene-based rubber gel having a toluene swelling index $Q_i$ of 16 to 70 and 51.9 to 89.9% by weight of conjugated diene monomer units 48 to 10% by weight of an aromatic vinyl monomer units and 0.1 to 1.2% by weight of polyfunctional monomer units,
  (B) 3 to 40 parts by weight, based upon 100 parts by weight of the total rubber component, of a dipentene-styrene copolymer resin having a softening point of 125° C. to 150° C. and
  (C) 50 to 200 parts by weight, in total, of carbon and silica having a nitrogen adsorption specific surface area ($N_2SA$) of 80 to 400 $m^2/g$.

5. The method as claimed in claim 4, wherein the softening point of the copolymer resin is 125° C. to 140° C.

* * * * *